J. F. MYERS.
SWINE FEEDER.
APPLICATION FILED FEB. 6, 1915.

1,156,428.

Patented Oct. 12, 1915.

Witnesses:
R. F. Lansdale
V. H. Whitman

Inventor
John F. Myers
By
C. F. Belt
Attorney.

UNITED STATES PATENT OFFICE.

JOHN F. MYERS, OF MILLERSBURG, OHIO.

SWINE-FEEDER.

1,156,428. Specification of Letters Patent. Patented Oct. 12, 1915.

Application filed February 6, 1915. Serial No. 6,493.

*To all whom it may concern:*

Be it known that I, JOHN F. MYERS, a citizen of the United States, residing at Millersburg, in the county of Holmes and State of Ohio, have invented certain new and useful Improvements in Swine-Feeders, of which the following is a specification.

This invention relates to stock feeding devices, and pertains especially to a swine feeding device of simple and inexpensive construction, and embodying certain advantageous features as will be hereinafter fully described.

The object of the invention is to provide a swine feeding device for exposing a certain portion of the feed in individual feed holders communicating with the inclosed body of the feed, and to furnish special means in connection with said holders for separating the heads of the swine during feeding.

A further object of the invention is to provide a series of independent feed agitators, one for each feed holder, said agitators being of such construction and arrangement as to be operated by the swine while feeding, and thereby prevent packing or clogging of the feed.

Various other objects, advantages and improved results are attainable in the practical application of the device, as will be hereinafter set forth.

Figure 1:
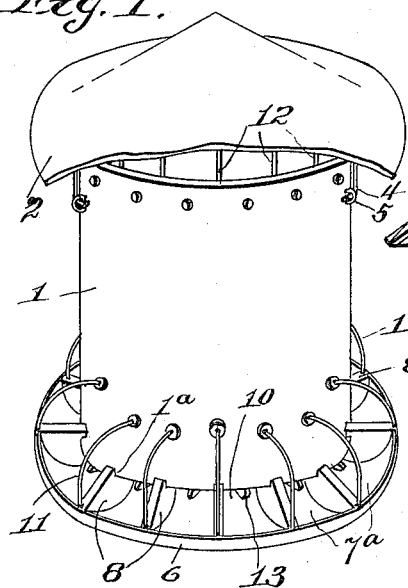
Figure 2:
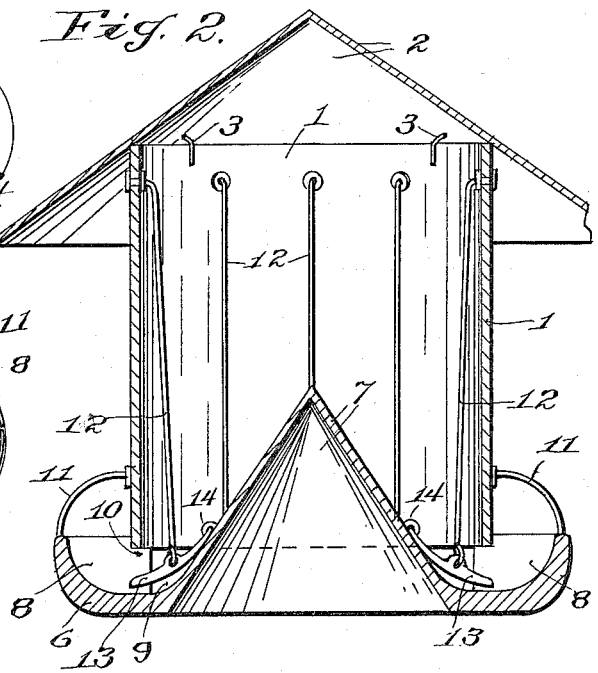
Figure 3:
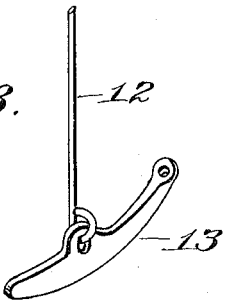
Figure 4:
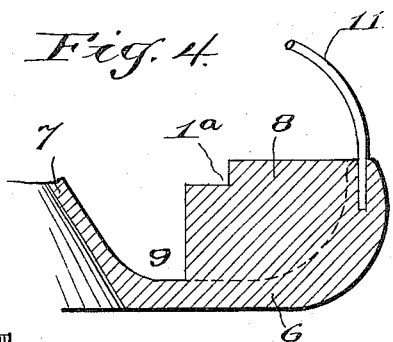
Figure 5:
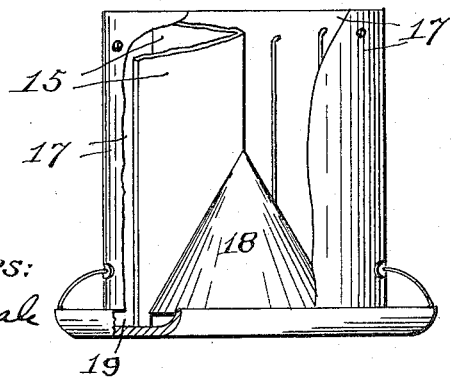

In the accompanying drawings forming part of this application:—Figure 1 is a perspective view partly broken away. Fig. 2 is a central vertical sectional view showing the agitators in elevation. Fig. 3 is a detail perspective view of one of the agitators partly broken away. Fig. 4 is a detail sectional view. Fig. 5 is a side elevation, partly broken away, showing a modification.

The same reference characters denote the same parts throughout the several views of the drawings.

In carrying out my invention I employ a cylindrical feed receptacle 1, provided with an over-hanging top or cover 2, having projections 3 fitting within the top of the cylinder 1, and hooks 4 for engaging suitable eyes 5 on the periphery of the cylinder. The cylinder 1 is secured upon a circular trough 6, having a central cone 7 reaching well up into the cylinder 1. The trough 6 is concaved from the base of the cone to the annular edge of the trough, and the trough concavity is divided into a plurality or series of independent feed holders 7ª, by means of radial plates 8 having a shoulder 1ª and extending from the annular edge of the trough to within a short distance of the base of the cone so as to leave a space or feed passage 9 between the inner end of the plates and the base of the cone. The cylinder 1 is secured in vertical position on the shoulder of the partition plates 8, so as to leave a feed passage 10 between the bottom edge of the cylinder and the bottom of the trough or feed holders. Each partition plate 8 is provided with a fender 11, having one end secured at the juncture of the plates and the annular edge of the trough, whence the fenders extend upwardly and inwardly to the periphery of the cylinder to which they are secured.

Each feed holder 7ª is provided with an agitator consisting of a pendant rod 12 having one end pivoted to and within the cylinder adjacent to the top end of the cylinder, and depending near the bottom edge of the cylinder, where the other or lower end of the rod is attached to and suspends a stirrer 13. There is a stirrer 13 and a suspending rod 12 for each feed holder 7ª, therefore only one of the stirrers will be described in detail. One end of the stirrer is pivoted to the cone at 14, so as to permit the stirrer to be given swinging movement by the pendant movement of the rod, the other end of the stirrer is left free and extends under the bottom edge of the cylinder between the partition plates so as to be worked by the nose of the swine to increase the feed deposit into the trough compartments or feed holders, and to facilitate the fall or passage of the feed through and from the cylinder.

It will be observed that the plates 8 do not extend into engagement with the cone, and therefore a feed passage is left around the base of the cone. It will also be seen that the plates 8, form feeding compartments in the trough, and by reason of the radial position of the plates the said compartments or feed dispensing holders increase in width from the inner end of the plates to the outer edge of the trough, thereby allowing the feed to spread as it enters the holders. The plates 8 also form a support for the cylinder and hold it spaced apart from the trough.

The agitators not only work the feed at the mouth of the holders 7ᵃ, but the agitator rods which are distributed around within the cylinder keep the feedway open directly to each of said holders. The agitators are suspended out of contact with the cone so as to work in the body of the feed as it slides downwardly on the cone surface, and so that there shall be no frictional contact between the cone surface and the agitators. Should the feed become clogged or fail to move to the trough, the top end of the agitator rods may be reached and operated from the top of the cylinder.

Referring to the modification shown in Fig. 5, a supplemental compartment is provided for storing feed which may or may not be of the same character as the feed contained in the cylinder. Said compartment is preferably V-shaped and it comprises a pair of vertical side walls 15 secured to the inner periphery of the cylinder 17. The walls 15 are secured at one end to the cone 18, so that the latter forms the bottom of the V-shaped compartment, and the other end of said walls terminates flush with the top edge of the cylinder. The V-shaped or supplemental compartment has only two trough feeders 19 which may be used independently, especially for feeding only one or two swine at one time, or where it is desired to feed certain swine certain particular food.

It is to be understood that the device may be made with or without the supplemental compartment, and that the number of trough feeding compartments may be increased or diminished, as desired in the manufacture of the device.

The fenders or guards 11, are of such shape and position relative to the partition plates as to prevent a swine reaching its head over the plates of the compartment in which it is feeding into the adjacent compartments. The said guards have another important function, in that they form a substantial brace between the cylinder and the outer edge of the trough engaged by the swine in feeding.

Obviously the trough is made of sufficient weight, that with the weight of the cylinder and other parts, the device will remain in upright position.

I do not wish to be understood as limiting or confining the invention to any particular materials, size, or means for assembling the parts, but reserve to myself the right to make such changes in the practical production of the device as may come within the scope of the appended claim.

Having thus described my invention what I claim as new and desire to secure by Letters Patent is:—

The combination with a ring feeding trough having a cone-shaped closed center, and a cylinder suspended over the trough so as to form an annular passage between the cylinder and the base of the cone, a plurality of agitators pivoted to the cone and projecting radially therefrom, and rods pivoted to the cylinder for suspending the agitators.

In witness whereof I hereunto set my hand in the presence of two witnesses.

JOHN F. MYERS.

Witnesses:
  CARL SCHULER,
  CLARENCE HOWENSTINE.